(12) United States Patent
Rudolph et al.

(10) Patent No.: US 10,838,769 B2
(45) Date of Patent: Nov. 17, 2020

(54) APPLICATION PROGRAM INTERFACE BASED SERVICE LOOKUP IN A SERVICE ARCHITECTURE

(71) Applicant: International Business Machines Corporation, Armonk, NY (US)

(72) Inventors: Oliver Rudolph, Tubingen (DE); Hendrik Haddorp, Holzgerlingen (DE); Timo Kußmaul, Beoblingen (DE); Uwe Hansmann, Tuebingen (DE); David Winter, Boeblingen (DE); Udo Schoene, Boeblingen (DE); Anke Lüdde, Herrenberg (DE); Andreas Prokoph, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/194,255

(22) Filed: Nov. 16, 2018

(65) Prior Publication Data

US 2020/0159591 A1    May 21, 2020

(51) Int. Cl.
*G06F 3/00* (2006.01)
*G06F 9/50* (2006.01)
(Continued)

(52) U.S. Cl.
CPC ............ *G06F 9/5055* (2013.01); *G06F 9/451* (2018.02); *G06F 9/4881* (2013.01); *G06F 9/541* (2013.01); *H04L 67/16* (2013.01); *H04L 67/2804* (2013.01)

(58) Field of Classification Search
CPC ........................................................ G06F 9/54
(Continued)

(56) References Cited

U.S. PATENT DOCUMENTS

| 6,813,640 B1 * | 11/2004 | Benson | ................. G06F 9/542 |
| | | | 709/229 |
| 8,752,006 B1 * | 6/2014 | Tolle | ........................ G06F 8/30 |
| | | | 717/106 |

(Continued)

FOREIGN PATENT DOCUMENTS

| CN | 105577780 A | 5/2016 |
| CN | 107438107 A | 12/2017 |

OTHER PUBLICATIONS

Benchaphon, Web Service Composition with Case-Based Reasoning. (Year: 2003).*

*Primary Examiner* — Lechi Truong
(74) *Attorney, Agent, or Firm* — North Shore Patents, P.C.; Joseph L. Acayan

(57) ABSTRACT

Embodiments generally relate to finding a service in a service infrastructure. In some embodiments, a method includes receiving a service lookup request, where the service lookup request includes an application program interface (API) specification for a service to be invoked, where the API specification defines at least one target input parameter and at least one target output parameter. The method further includes searching for at least one service that has an API specification that corresponds to the API specification included in the service lookup request. The method further includes determining a sequence of services if no service is found that has an API specification that corresponds to the API specification included in the service lookup request, where services of the sequence of services include API specifications that, in combination, correspond to the API specification included in the service lookup request; and invoking the services of the sequence of services.

17 Claims, 7 Drawing Sheets

(51) Int. Cl.
*G06F 9/48* (2006.01)
*H04L 29/08* (2006.01)
*G06F 9/451* (2018.01)
*G06F 9/54* (2006.01)

(58) Field of Classification Search
USPC .......................................................... 719/328
See application file for complete search history.

(56) References Cited

U.S. PATENT DOCUMENTS

| | | | |
|---|---|---|---|
| 2006/0116991 A1* | 6/2006 | Calderwood | G06F 9/547 |
| 2013/0055287 A1* | 2/2013 | Pope | G06F 9/546 |
| | | | 719/314 |
| 2016/0019102 A1* | 1/2016 | Cui | G06F 9/542 |
| | | | 719/328 |
| 2017/0046146 A1 | 2/2017 | Jamjoom et al. | |
| 2017/0244593 A1 | 8/2017 | Rangasamy et al. | |
| 2018/0330010 A1* | 11/2018 | Seki | G06F 9/541 |
| 2019/0004873 A1* | 1/2019 | Liu | G06F 16/90335 |

\* cited by examiner

APPLICATION PROGRAM INTERFACE BASED SERVICE LOOKUP IN A SERVICE ARCHITECTURE

BACKGROUND

Microservices are small, lightweight applications with relatively simple functionality such as accessing particular data. A developer of a microservice, also referred to herein as service, creates a description of an application program interface (API) that the service provides. Services often work with other services to procure needed data. If a given service needs to use an API of another service to perform work, the developer searches available documentation for a service that provides an appropriate API. The name of the service and API details are hard-coded into the calling service. At runtime, the calling service performs a service lookup by the service name. The service lookup results are the Internet Protocol (IP) address and port of the service that provides the API. The calling service then uses the hard-coded API details such as context path, headers, and query parameters to perform the API call. Finding an appropriate API may be a tedious task for developers. Also, dependent services need to be updated if there is a service name change, if an API changes, or if an API is split into two services.

SUMMARY

Disclosed herein is a method for finding a service in a service infrastructure, and system and computer program product as specified in the independent claims. Embodiments are given in the dependent claims. Embodiments can be freely combined with each other if they are not mutually exclusive.

In an embodiment, a method includes receiving a service lookup request, where the service lookup request includes an application program interface (API) specification for a service to be invoked, where the API specification defines at least one target input parameter and at least one target output parameter. The method further includes searching for at least one service that has an API specification that corresponds to the API specification included in the service lookup request. The method further includes determining a sequence of services if no service is found that has an API specification that corresponds to the API specification included in the service lookup request, where services of the sequence of services include API specifications that, in combination, correspond to the API specification included in the request. The method further includes invoking the services of the sequence of services.

In another embodiment, the method further includes generating a graph that connects services based at least in part on their respective input parameters and output parameters. In another aspect, to search for at least one service that has an API specification that corresponds to the API specification included in the service lookup request, the method further includes searching service instances that are registered in a service registry. In another aspect, where at least one first service of the sequence of services is associated with at least one input parameter corresponding to the at least one target input parameter of the API specification, and where at least one second service of the sequence of services associated with at least one output parameter corresponding to the at least one target output parameter of the API specification. In another aspect, the method further includes returning respective service addresses of all services of the sequence of services. In another aspect, the method further includes deploying a proxy service that invokes the services of the sequence of services. In another aspect, the method further includes returning a service address of a proxy service to an API gateway.

DETAILED DESCRIPTION

Embodiments described herein facilitate application program interface (API) based service lookups in a service architecture. As described in more detail herein, a system performs service lookups in a service architecture, where a service lookup is performed based on the API that another service is required to use. Embodiments enable a needed service to be looked up without needing to know the name of the service. The needed service is looked up based on API characteristics. As a result, embodiments avoid conventional hardcoding techniques and find needed services despite service name changes, API changes, etc. As described in more detail herein, the system also provides a registration process to facilitate service lookups. The system also provides proxy services that facilitate service lookups that involve multiple services.

As described in more detail herein, in some embodiments, a system receives a service lookup request, where the service lookup request includes an application program interface (API) specification for a service to be invoked, where the API specification defines at least one target input parameter and at least one target output parameter. The system then searches for at least one service or service instance that has an API specification that corresponds to the API specification included in the service lookup request. If a service is found, the system invokes the service. If no service is found that has an API specification that corresponds to the API specification included in the request, the system determines a sequence of services, where services of the sequence of services include API specifications that, in combination, correspond to the API specification included in the request. The system then invokes the services of the sequence of services. Note that each service may have multiple services instances. As such, while various implementations are described herein in the context of searching for and invoking one or more services, these implementations also apply to the searching for and invoking one or more service instances.

Figure 1:
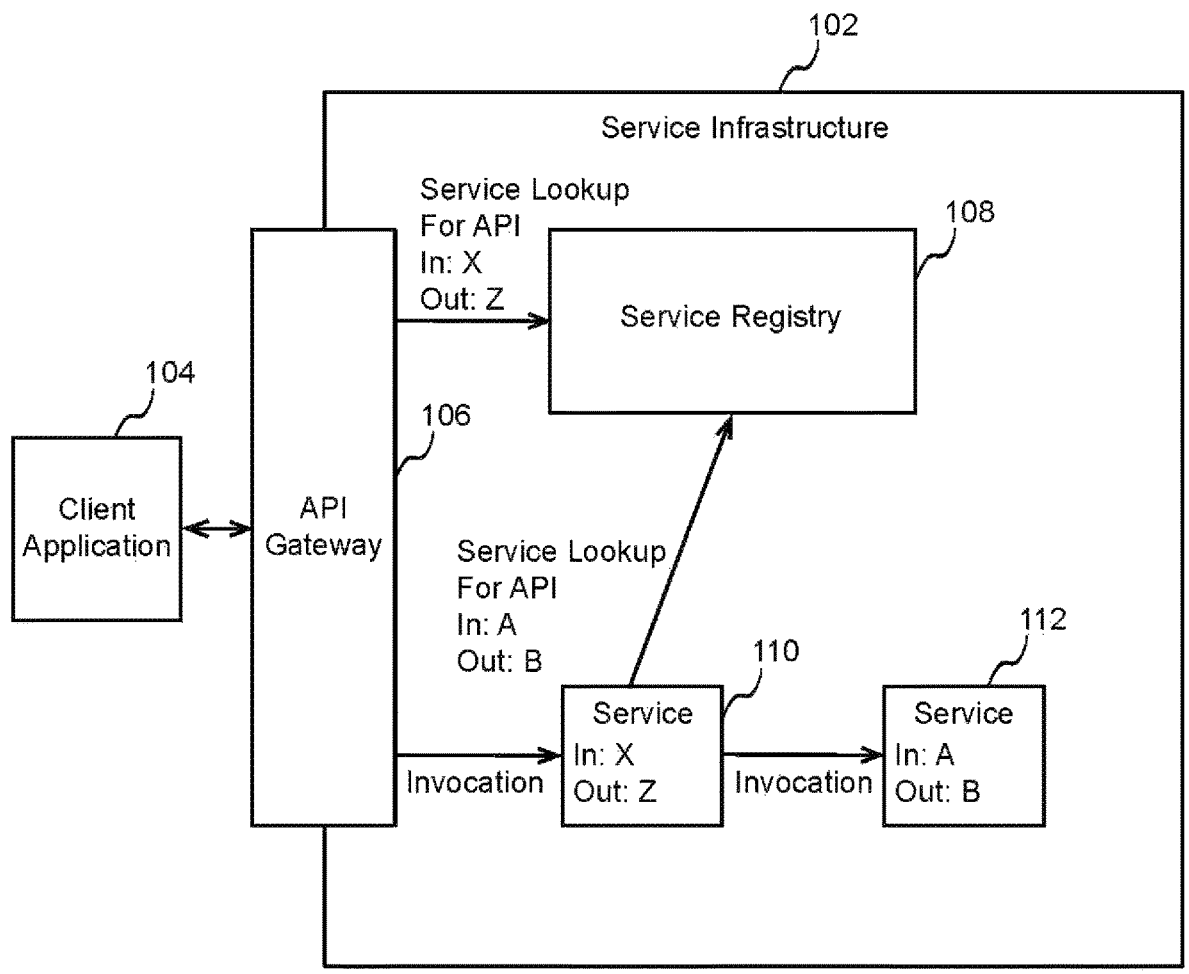
FIG. 1 is an example service infrastructure environment, according to some embodiments.

FIG. 1 is an example service infrastructure environment 100, according to some embodiments. Shown is a service infrastructure 102, which provides services to a client application 104. As used herein, the term "service infrastructure"

102 may also be referred to as simply "system" 102. Client application 104 communicates with service infrastructure 102 via an API gateway 106.

In various embodiments, service infrastructure 102 and its associated services serve multiple users and multiple tenants. A tenant is a group of users (e.g., a company) who share a common access with specific privileges to the software instance. Service infrastructure 102 ensures that tenant specific data is isolated from other tenants. Typically, client requests and service requests contain a tenant identifier (ID) of the tenant, which is associated with a request. This enables the service infrastructure component to establish the required context and state for processing the request.

Client application 104 may connect with API gateway 106 via any suitable network or combination of networks such as the Internet, etc. and use any suitable communication protocols such as Wi-Fi, Bluetooth, etc. Service infrastructure 102 may be built on the basis of cloud computing. API gateway 106 provides access to client applications like Smartphone applications, desktop applications, scripts executed in a browser etc. API gateway 106 receives service requests issued by client applications, and creates service lookup requests based on the service requests.

As shown, service infrastructure 102 includes a service registry 108 that looks up services such as service 110, service 112, etc. As indicated above, each service may have multiple services instances. As such, service 110 and service 112 may represent or include multiple service instances. As used herein, the terms service and service instance may be used interchangeably depending on the context. As described in more detail herein, service registry 108 looks up services and/or service instances in response to a service lookup request such as one from API gateway 106 in response to a service request from client application 104.

In various embodiments, in a service-oriented architecture, a service is a software component that provides an API, which can be accessed or invoked by other services or software components using a standard protocol or a standard invocation mechanism. A service may be implemented, created, removed, deployed, started and stopped independently of other services. A microservice is a service that is designed to be lightweight and granular. As used herein, the term service and the term microservice may be used interchangeably.

In some embodiments, there may be multiple instances of one service running in order to improve fault tolerance, throughput, and load balancing of requests. Each of a service's instances provides the same APIs and the same functionality, and are based on the same implementation (e.g., code, docker image, deployment artifact, etc.).

Services interact by sending requests for invoking operations to one of the APIs provided by a service. The requests usually contain an identifier of the requested API operation (e.g. in the form of a URL or another parameter) as well as further data that is relevant for processing the request.

Usually there is at least one service registry in a service infrastructure that provides functionality for service discovery or service lookup. Service registry 108 manages information about the active/running services in the service infrastructure.

In an example embodiment, service 110 has registered at service registry 108 with the following API specification:

```
{
"in": [ "X" ],
"out": ["Z"]
}
```

In various embodiments, the API specification lists the set of input parameters and output parameters in a defined format, e.g., in a JSON-Format with well defined attributes. As shown in this example, the API specification defines X as an input parameter, and defines Z as an output parameter. The API specification may also designate the semantics of the service, corresponding to a semantic ontology.

For ease of illustration, one input parameter and one output parameter are shown for each service in these examples. In other scenarios, there may be multiple one input parameters and/or multiple output parameters for any one or more services.

Service 112 also has registered at service registry 108 with the following API specification:

```
{
"in": [ "A" ],
"out": ["B"]
}
```

As shown in this example, the API specification defines A as an input parameter, and defines B as an output parameter.

In various embodiments, when API gateway 106 receives a service request from client application 104, API gateway 106 creates a service lookup request based on the context of the service request, which contains the following API specification:

```
{
"in": [ "X" ],
"out": ["Z"]
}
```

Service registry 108 determines that the API specification of service 110 conforms or corresponds to the API specification of the service lookup request. Service registry 108 then returns the address of service 110 to API Gateway 106, which in turn invokes service 110.

In this example embodiment, to process this request, service A 110 needs to invoke service 112. Service 110 issues a lookup request to service registry 108 with the following API specification:

```
{
"in": [ "A" ],
"out": ["B"]
}
```

Service registry 108 determines that service 112 conforms or corresponds to the API specification required by service 110. Service registry 108 then returns the address of service 112 to service 110. In other words, service 110 invokes service 112, service 110 receives the response, service 110 continues processing and returns its response to API gateway 106.

While various components of service infrastructure 102 such as service registry 108 are described as performing some embodiments described herein, in other embodiments, any suitable component or combination of components associated with the overall system or service infrastructure 102, including any suitable processor or processors associated with the system may facilitate performing the embodiments described herein. In various embodiments, service infrastructure environment 100 may not have all of the components shown and/or may have other elements including other types of elements instead of, or in addition to, those shown herein.

Figure 2:
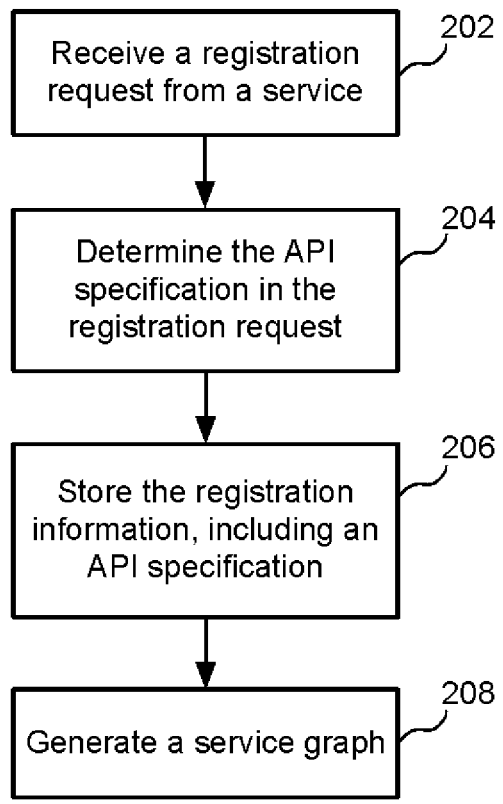
FIG. 2 is an example flow diagram for service registration, according to some embodiments.

FIG. 2 is an example flow diagram for service registration, according to some embodiments. As described in more detail herein, the system registers services, including generating a service graph that connects services based at least in part on their respective input parameters and output parameters. The following flow diagram applies to each service associated with service infrastructure 102, or system 102. In various embodiments, service registry 108 of system 102 performs the following steps of the flow diagram at service startup.

Referring to both FIGS. 1 and 2, a method begins at block 202, where service registry 108 of system 102 receives a registration request from a service (e.g., service 110). The registration request includes registration information, including an API specification (e.g., input parameter X, output parameter Z, etc.) and the address of the service instance (e.g., address of service A 110). In various embodiments, each service of the system registers itself at the service registry.

At block 204, service registry 108 determines the API specification provided by the service in the registration request. At block 206, service registry 108 stores the registration information, including an API specification. In various embodiments, service registry 108 also stores the address of the service instance. At block 208, service registry 108 generates a service graph that connects the API of the service with its input and output parameters. As described in more detail herein, service registry 108 uses the service graph to perform service lookups.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
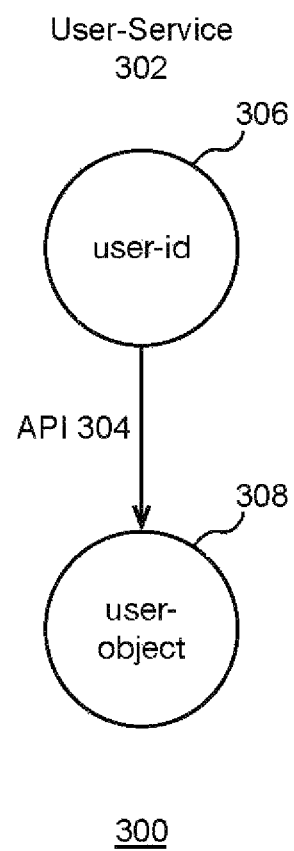
FIG. 3 is an example service graph, according to some embodiments.

FIG. 3 is an example service graph 300, according to some embodiments. As shown, a User-Service 302 provides an API 304: input parameter user-id 306 to output parameter user-object 308. In this example embodiment, User-Service 302 provides API 304 to any calling service such as API gateway 106, service 110, for example. Service registry 108 of the system 102 searches graph 300 for a path from user-id 306 to user-object 308. Service registry 108 finds API 304 as the result. Service registry 108 returns the details of the User-Service API 304 to the calling service.

Figure 4:
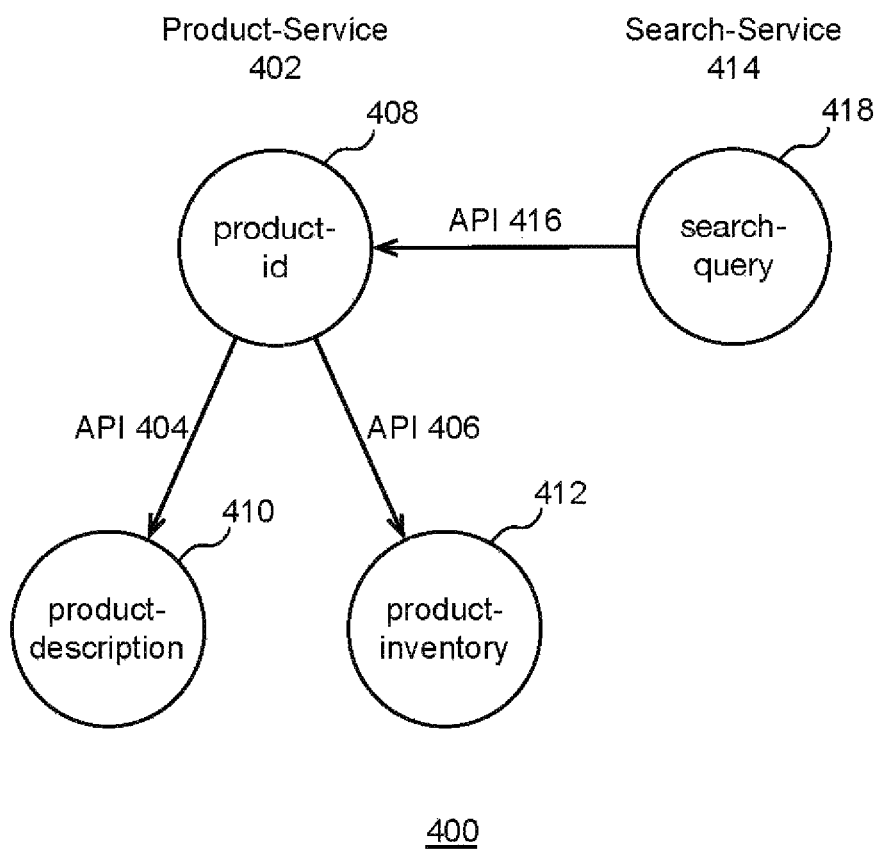
FIG. 4 is an example service graph with multiple APIs, according to some embodiments.

FIG. 4 is an example service graph 400 with multiple APIs, according to some embodiments. As shown, a Product-Service 402 provides two APIs 404 and 406: input parameter product-id 408 to output parameter product-description 410, and input parameter product-id 408 to output parameter product-inventory 412. A Search-Service 414 provides an API 416: input parameter search-query 418 to output parameter list of product-id 408.

As shown, some scenarios may exist where the shortest path contains multiple nodes. For example, if a service requests an API to obtain product-inventory 412 by search-query 418, the result would be the API sequence API 416 and then API 406.

Service registry 108 may return the details of Search-Service API 416 and Product-Service API 406 to the calling service. In some embodiments, the service may call API 404 first to get product-id 408 (or list of product ids) and then use API 406 to obtain the corresponding inventory of the products (e.g., product-inventory 412).

In some embodiments, service registry 108 may generate multiple service graphs as needed to graph various different sets of APIs, or may combine various different service graphs that share one or more common APIs.

In various embodiments, service registry 108 maintains information about the status or health of each service instance, and only considers healthy services for service discovery or service lookup requests. In case a service instance becomes unresponsive or unhealthy, service registry 108 will no longer provide its address or information about this service instance to other services. In some embodiments, Service registry 108 may also incorporate a load-balancing algorithm for distributing load between service instances like random choice, round robin, or least connections.

A service or service instance may register at service registry 108, usually immediately after starting, e.g. by sending a registration request including its address, as well as further data such as a service identifier or a set of identifiers of APIs provided by the service. Service registry 108 then regularly invokes a health check (status request) on each registered service or service instance. The invoked service will then respond by returning status information. In some embodiments, the status information may contain a flag indicating whether the service is healthy or unhealthy. If the returned status indicates a problem or if the service does not respond in time, service registry 108 may flag this service as unhealthy. As such, service registry 108 may select a service instance based on two simple criteria: a binary flag representing the health status, and a service identifier like a service name.

Embodiments described herein enable a developer to no longer need to hard-code the name of other services and API details, such as context path, into a service, etc. Instead, the service can look up the other services API at runtime by simply providing the input and output parameters.

Figure 5:
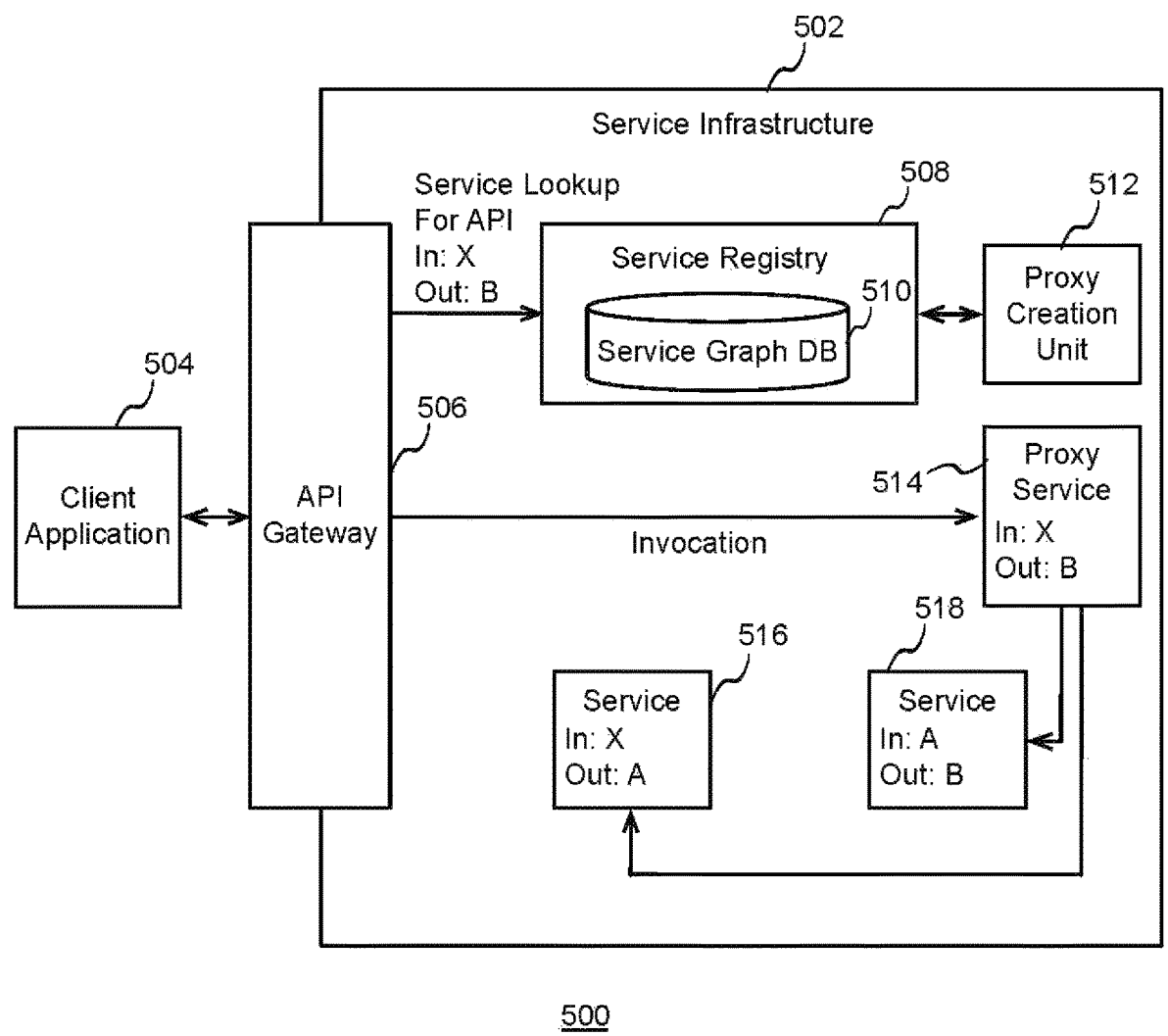
FIG. 5 is the example service infrastructure environment including service graph and proxy features, according to some embodiments.

FIG. 5 is the example service infrastructure environment 500, including service graph and proxy features, according to some embodiments. Shown is a service infrastructure 502 or system 502, a client application 504, an API gateway 506, and a service registry 508.

In various embodiments, service infrastructure environment 500 generally operates similarly to service infrastructure environment 100 of FIG. 1, except that service infrastructure environment 500 involves a service graph and proxy features. As shown, service registry 508 includes a service graph database 510, which stores one or more service graphs, such as services graphs 300 and 400 of respective FIGS. 3 and 4, for example. Service infrastructure 502 also includes a proxy creation unit 512 that creates a proxy service 514. Proxy service 514 invokes a series of services such as service 516 and server 518.

Further embodiments and operations of service infrastructure 502 are described in more detail below in connection with FIG. 6.

Figure 6:
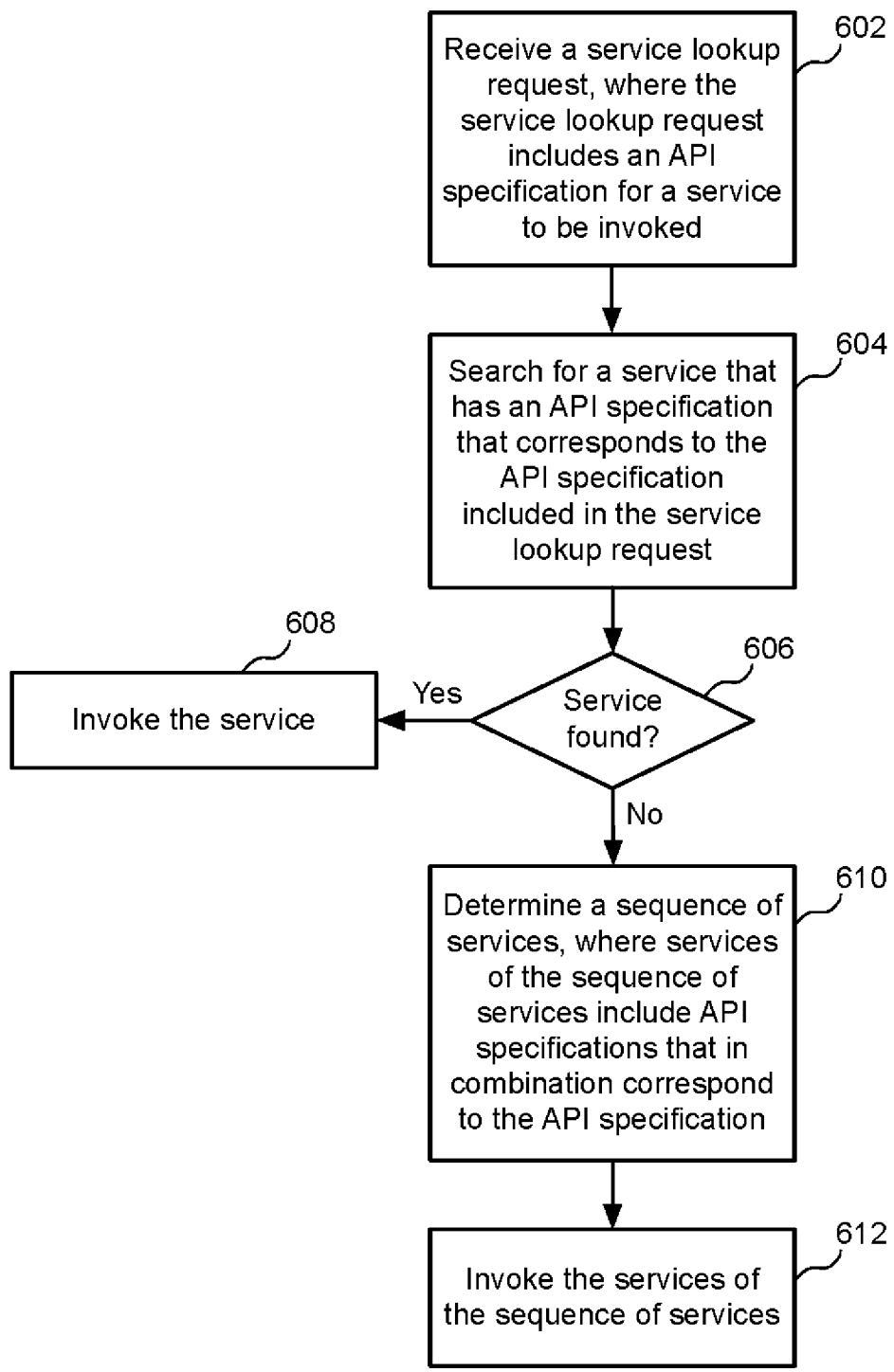
FIG. 6 is an example flow diagram for finding a service in a service infrastructure, according to some embodiments.

FIG. 6 is an example flow diagram for finding a service in a service infrastructure, according to some embodiments. As described in more detail herein, the system facilitates API based service lookups in a service architecture. Referring to both FIGS. 5 and 6, a method begins at block 602, where service registry 108 of system 102 receives a service lookup request from API gateway 106. API gateway 106 sends the service lookup request in response to a service request from client application 104. In various embodiments, the service lookup request includes an API specification for a service to be invoked, where the API specification defines at least one target input parameter and at least one target output parameter.

In an example scenario described above in connection to FIG. 1, a service lookup request has an input parameter or object X and requires an output parameter or object B. Input parameter X may be referred to as the target input parameter. Output parameter B may be referred to as the target output parameter.

In some embodiments, before API gateway 106 send the service lookup request to service registry 108, API gateway 106 determines the required API specification based on the content in the service request from client application 104, where the service request contains the API specification. Alternatively, the service request may contain a service name, a service identifier, etc., of the requested API, where API Gateway 106 uses a mapping table to map this identifier to an API specification. As shown, the following example API specification is determined:

```
{
"in": [ "X" ],
"out": ["B"]
}
```

As shown in this example, the API specification defines X as an input parameter, and defines B as an output parameter. API gateway 106 creates and sends a lookup request including this API specification.

At block 604, service registry 108 searches for at least one service that has an API specification that corresponds to the API specification included in the service lookup request. Continuing with the same example scenario, system 102 may execute a service lookup algorithm that analyzes the API specification provided in the service lookup. In various embodiments, service registry 108 searches for service instances, which are registered for the required API specification. More specifically, the service lookup algorithm then attempts to find a service that has an API specification that accepts object X as an input parameter, and that returns object B as an output parameter.

In various implementations, to search for at least one service that has an API specification that corresponds to the API specification included in the service lookup request, service registry 108 of system 102 searches service instances that are registered in service registry 508. In various embodiments, each service of multiple services in service registry 508 is associated with one or more APIs. Also, each API includes an API specification that defines at least one input parameter and at least one output parameter.

At block 606, the system determines if at least one service is found that has an API specification that corresponds to the API specification included in the service lookup request, thereby meeting the requirements of the API specification.

At block 608, if at least one service has an API specification that corresponds to the API specification included in the service lookup request, the system invokes the service. An example of this scenario is described above in connection with FIG. 1.

At block 610, if no service is found that has an API specification that corresponds to the API specification included in the service lookup request, service registry 108 determines a sequence of services, or API sequence, where the services of the sequence of services include API specifications that, in combination, correspond to the API specification included in the service lookup request.

In various implementations, at least one first service of the sequence of services is associated with at least one input parameter corresponding to the at least one target input parameter of the API specification. Following the same example scenario, service 516 provides an API from X to A. Also at least one second service of the sequence of services is associated with at least one output parameter corresponding to the at least one target output parameter of the API specification. For example, service 518 provides an API from A to B. As such, the system may return this sequence as lookup result to invoke proxy service 514, which in turn invokes services 516 and 518 (e.g., X to A and from A to B). As such, the combination of API specification of services 516 and 518 comply or correspond with the require API specification of the service lookup request.

In various embodiments, service registry 108 searches one or more service graphs in service graph database 510 for a path that connects the input parameter(s) of the lookup request with the output parameter(s). The edges of the resulting path are the APIs that the registry returns to the caller. The result may be a single edge/API or a sequence of edges/APIs that comply with the required API specification. Further embodiments directed at the use of a service graph are described in more detail below.

At block 612, service registry 108 invokes the services of the sequence of services. In various implementations, service registry 108 returns respective service addresses of all services in the sequence of services (e.g., address of service 516, address of service 518, etc.) to API gateway 506. This enables the client to perform a chain of request in order to ultimately obtain the target output. The address may include a HTTP URL, or a hostname, or IP address and port, etc. As such, invoking proxy service 514 in turn invokes services 516 and 518. In various implementations, the system deploys proxy service 514 that invokes the services of the sequence of services. The system also returns a service address of the proxy service to API gateway 506, which initiated the service lookup request.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In various embodiments, a service registry such as service registry 508 now computes a graph of registered services. To do so, service registry 508 inserts the API specifications in service graph database 510. Service registry 508 creates and issues a set of graph database queries. Service graph database 510 returns a set of service instances, which when invoked in sequence conform to the API specifications and accept the target input parameter(s) and return the target output parameter(s).

The following describes various example scenarios applying embodiments described herein. In some embodiments, service registry 508 invokes the service instances in the sequence and returns the resulting response. Service registry

508 also returns a flag to the service that initiated the lookup request. The flag notifies the issuer of the lookup request that service registry 508 has already processed.

In some embodiments, service registry 508 returns another flag and the ordered set of service addresses of the sequence of services to the service that initiated the lookup request. The flag indicates that service registry 508 response contains multiple service addresses. The service that initiated the lookup request then invokes these service instances in the sequence given by the ordering in the lookup response.

In some embodiments, service registry 508 may invoke the proxy creation unit 512 to create proxy service 514, as indicated above. Service registry 508 passes the API specification as well as the sequence of services to proxy creation unit 512. Proxy creation unit 512 creates and deploys a service instance. As such, upon receiving a request, proxy creation unit 512 invokes the sequence of service instances. If this sequence of service invocations is successful it returns the resulting output parameter, otherwise it returns an error.

In some embodiments, proxy creation unit 512 contains a predefined template (e.g., a docker file, etc.) and adapts this template based on the sequence of services. Proxy creation unit 512 then runs required commands for creating a docker image, for deploying, and for starting the corresponding container. In some embodiments, the docker file may include code or commands that register a new service instance for the corresponding API specification at service registry 508. After receiving the corresponding registration request for the newly created proxy service, service registry 508 returns the address of the newly created proxy service to the calling service.

Figure 7:
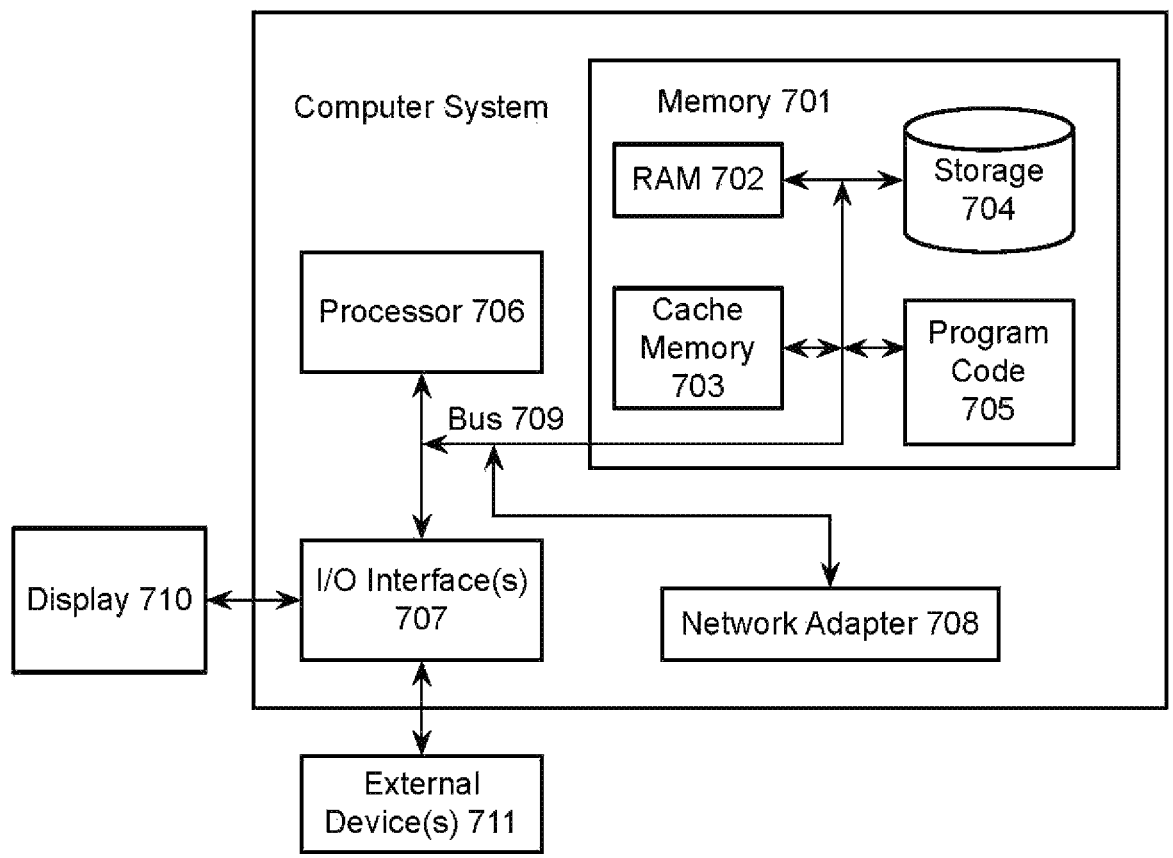
FIG. 7 is a block diagram of an example computer system, which may be used for embodiments described herein.

FIG. 7 is a block diagram of an example computer system 700, which may be used for embodiments described herein. The computer system 700 is operationally coupled to one or more processing units such as processor 706, a memory 701, and a bus 709 that couples various system components, including the memory 701 to the processor 706. The bus 709 represents one or more of any of several types of bus structure, including a memory bus or memory controller, a peripheral bus, an accelerated graphics port, and a processor or local bus using any of a variety of bus architectures. The memory 701 may include computer readable media in the form of volatile memory, such as random access memory (RAM) 702 or cache memory 703, or storage 704, which may include non-volatile storage media or other types of memory. The memory 701 may include at least one program product having a set of at least one program code module such as program code 705 that are configured to carry out the functions of embodiment of the present invention when executed by the processor 706. The computer system 700 may also communicate with a display 710 or one or more other external devices 711 via input/output (I/O) interfaces 707. The computer system 700 may communicate with one or more networks via network adapter 708.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
  at least one processor and a computer readable storage medium having program instructions embodied therewith, the program instructions executable by the at least one processor to cause the at least one processor to perform operations comprising:
  receiving a service lookup request, wherein the service lookup request includes an application program interface (API) specification for a service to be invoked, wherein the API specification defines at least one target input parameter and at least one target output parameter;
  analyzing the API specification included in the service lookup request;
  searching for at least one service that has an API specification that corresponds to the API specification included in the service lookup request;
  determining from a service registry a sequence of services if no service is found that has an API specification that corresponds to the API specification included in the service lookup request, wherein at least one first service of a sequence of services and at least one second service of the sequence of services are registered in the service registry, wherein the at least one first service of the sequence of services is configured to accept the at least one target input parameter defined in the API specification included in the service lookup request, and wherein the at least one second service of the sequence of services is configured to return the at least one target output parameter defined in the API specification included in the service lookup request, and wherein the determining of the sequence of services comprises:
    performing a status request on each service registered in the service registry;
    receiving status information from each service registered in the service registry, wherein the status information comprises a flag indicating whether the service is healthy or unhealthy; and
    selecting one or more service instances for the sequence of services that have a healthy status; and
  invoking the services of the sequence of services.

2. The system of claim 1, wherein the at least one processor further performs operations comprising generating a graph that connects services based at least in part on their respective input parameters and output parameters.

3. The system of claim 1, wherein, to search for at least one service that has an API specification that corresponds to the API specification included in the service lookup request, the at least one processor further performs operations comprising searching service instances that are registered in the service registry.

4. The system of claim 1, wherein the at least one processor further performs operations comprising returning respective service addresses of all services of the sequence of services.

5. The system of claim 1, wherein the at least one processor further performs operations comprising deploying a proxy service that invokes the services of the sequence of services.

6. The system of claim 1, wherein the at least one processor further performs operations comprising returning a service address of a proxy service to an API gateway.

7. A computer program product comprising a non-transitory computer readable storage medium having program instructions embodied t herewith, the program instructions executable by at least one processor to cause the at least one processor to perform operations comprising:
  receiving a service lookup request, wherein the service lookup request includes an application program interface (API) specification for a service to be invoked, wherein the API specification defines at least one target input parameter and at least one target output parameter;

analyzing the API specification included in the service lookup request;

searching for at least one service that has an API specification that corresponds to the API specification included in the service lookup request;

determining from a service registry a sequence of services if no service is found that has an API specification that corresponds to the API specification included in the service lookup request, wherein at least one first service of a sequence of services and at least one second service of the sequence of services are registered in the service registry, wherein the at least one first service of the sequence of services is configured to accept the at least one target input parameter defined in the API specification included in the service lookup request, and wherein the at least one second service of the sequence of services is configured to return the at least one target output parameter defined in the API specification included in the service lookup request, and wherein the determining of the sequence of services comprises:

performing a status request on each service registered in the service registry;

receiving status information from each service registered in the service registry, wherein the status information comprises a flag indicating whether the service is healthy or unhealthy; and selecting one or more service instances for the sequence of services that have a healthy status; and invoking the services of the sequence of services.

8. The computer program product of claim 7, wherein the at least one processor further performs operations comprising generating a graph that connects services based at least in part on their respective input parameters and output parameters.

9. The computer program product of claim 7, wherein, to search for at least one service that has an API specification that corresponds to the API specification included in the service lookup request, the at least one processor further performs operations comprising searching service instances that are registered in the service registry.

10. The computer program product of claim 7, wherein the at least one processor further performs operations comprising returning respective service addresses of all services of the sequence of services.

11. The computer program product of claim 7, wherein the at least one processor further performs operations comprising deploying a proxy service that invokes the services of the sequence of services.

12. The computer program product of claim 7, wherein the at least one processor further performs operations comprising returning a service address of a proxy service to an API gateway.

13. A computer-implemented method for finding a service in a service infrastructure, the method comprising:

receiving a service lookup request, wherein the service lookup request includes an application program interface (API) specification for a service to be invoked, wherein the API specification defines at least one target input parameter and at least one target output parameter;

analyzing the API specification included in the service lookup request;

searching for at least one service that has an API specification that corresponds to the API specification included in the service lookup request;

determining from a service registry a sequence of services if no service is found that has an API specification that corresponds to the API specification included in the service lookup request, wherein at least one first service of a sequence of services and at least one second service of the sequence of services are registered in the service registry, wherein the at least one first service of the sequence of services is configured to accept the at least one target input parameter defined in the API specification included in the service lookup request, and wherein the at least one second service of the sequence of services is configured to return the at least one target output parameter defined in the API specification included in the service lookup request, and wherein the determining of the sequence of services comprises:

performing a status request on each service registered in the service registry;

receiving status information from each service registered in the service registry, wherein the status information comprises a flag indicating whether the service is healthy or unhealthy; and selecting one or more service instances for the sequence of services that have a healthy status; and invoking the services of the sequence of services.

14. The method of claim 13, further comprising generating a graph that connects services based at least in part on their respective input parameters and output parameters.

15. The method of claim 13, wherein, to search for at least one service that has an API specification that corresponds to the API specification included in the service lookup request, the method further comprises searching service instances that are registered in the service registry.

16. The method of claim 13, further comprising returning respective service addresses of all services of the sequence of services.

17. The method of claim 13, further comprising deploying a proxy service that invokes the services of the sequence of services.

* * * * *